United States Patent
Ali et al.

(10) Patent No.: US 12,199,684 B2
(45) Date of Patent: Jan. 14, 2025

(54) METHOD AND APPARATUS FOR MULTI PANEL RADAR OPERATION

(71) Applicant: Samsung Electronics Co., Ltd., Suwon-si (KR)

(72) Inventors: Anum Ali, Plano, TX (US); Jianhua Mo, Allen, TX (US); Boon Loong Ng, Plano, TX (US); Vutha Va, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 17/585,450

(22) Filed: Jan. 26, 2022

(65) Prior Publication Data

US 2022/0416911 A1    Dec. 29, 2022

Related U.S. Application Data

(60) Provisional application No. 63/213,988, filed on Jun. 23, 2021.

(51) Int. Cl.
*H04B 15/02* (2006.01)
*G01S 13/88* (2006.01)
(Continued)

(52) U.S. Cl.
CPC .............. *H04B 15/02* (2013.01); *G01S 13/88* (2013.01); *H01Q 3/005* (2013.01); *H04W 64/006* (2013.01)

(58) Field of Classification Search
CPC ....... H04B 15/02; H04B 7/0602; G01S 13/88; G01S 7/0236; H01Q 3/005; H04W 64/006
See application file for complete search history.

(56) References Cited

U.S. PATENT DOCUMENTS 10,698,081 B2   6/2020   Wallstedt et al.
10,725,150 B2   7/2020   Trotta et al.
(Continued)

FOREIGN PATENT DOCUMENTS

CN         107462885 A      12/2017
KR    10-2019-0131491 A     11/2019
(Continued)

OTHER PUBLICATIONS

International Search Report and Written Opinion issued Jun. 7, 2022 regarding Application No. PCT/KR2022/003026, 8 pages.
(Continued)

*Primary Examiner* — Mazda Sabouri

(57) ABSTRACT

A method and a wireless communication device for managing activation of radar modules in the device are disclosed herein. The device comprises a plurality of wireless communication modules, a plurality of radar modules, and a processor. The wireless communication modules comprise one or more antennas that are configured to transmit and receive wireless communication signals, and the radar modules comprise one or more antennas that are configured to transmit and receive radar signals. The processor is configured to determine which of the wireless communication modules are active, obtain spatial information comprising spatial positions within the device of the wireless communication modules and the radar modules, determine one or more transmission characteristics of the active wireless communication modules and the radar modules, determine a set of the plurality of radar modules to activate based on the spatial information and the transmission characteristics, and activate the determined set of radar modules.

20 Claims, 13 Drawing Sheets

(51) Int. Cl.
*H01Q 3/00* (2006.01)
*H04W 64/00* (2009.01)

(56) References Cited

U.S. PATENT DOCUMENTS

| | | |
|---|---|---|
| 10,782,390 B2 | 9/2020 | Lien et al. |
| 2009/0323782 A1 | 12/2009 | Baker et al. |
| 2013/0288742 A1 | 10/2013 | Yao et al. |
| 2017/0093457 A1 | 3/2017 | Jain et al. |
| 2018/0199377 A1 | 7/2018 | Sanderovich et al. |
| 2018/0227767 A1 | 8/2018 | Yamazaki et al. |
| 2018/0348340 A1 | 12/2018 | Lien et al. |
| 2020/0295854 A1 | 9/2020 | Narra et al. |
| 2020/0300996 A1 | 9/2020 | Cetinoneri et al. |
| 2020/0336222 A1 | 10/2020 | Rimini |
| 2021/0029662 A1 | 1/2021 | Son et al. |
| 2024/0147249 A1* | 5/2024 | Zou ....................... H04W 16/14 |

FOREIGN PATENT DOCUMENTS

| | | | |
|---|---|---|---|
| WO | 2020126050 A1 | 6/2020 | |
| WO | 2020191070 A1 | 9/2020 | |

OTHER PUBLICATIONS

Extended European Search Report issued Jun. 6, 2024 regarding Application No. 22828569.8, 9 pages.

\* cited by examiner

METHOD AND APPARATUS FOR MULTI PANEL RADAR OPERATION

CROSS-REFERENCE TO RELATED APPLICATION(S) AND CLAIM OF PRIORITY

This application claims priority under 35 U.S.C. § 119(e) to U.S. Provisional Patent Application No. 63/213,988 filed on Jun. 23, 2021, which is hereby incorporated by reference in its entirety.

TECHNICAL FIELD

This disclosure relates generally to managing interference in wireless communications systems that include radar modules and wireless communication modules. In particular, embodiments of this disclosure relate to methods and apparatuses for managing activation of radar modules in a wireless communication device.

BACKGROUND

Wireless communication has been one of the most successful innovations in modern history. Recently, the number of subscribers to wireless communication services exceeded five billion and continues to grow quickly. The demand for wireless data traffic is rapidly increasing due to the growing popularity among consumers and businesses of smart phones and other mobile data devices such as tablets, "note pad" computers, net books, eBook readers, and machine type of devices. In order to meet the high growth in mobile data traffic demand and support new applications and deployments, improvements in radio interface efficiency and coverage is of paramount importance.

Furthermore, radar and wireless communication are two alternative uses of the electromagnetic spectrum. Almost all consumer electronics have some form of wireless communication, and the use of radar in consumer electronics is increasing. Independent operations of communication and radar on one device may be negatively impacted when the RF isolation between the wireless communication and radar systems is not sufficiently good. Under this condition, simultaneous communication reception and radar transmission, or vice versa, may result in RF interference between the two systems.

SUMMARY

Embodiments of the present disclosure provide a method and a wireless communication device for managing activation of radar modules in the wireless communication device.

In one embodiment, a wireless communication device is provided, comprising a plurality of wireless communication modules, a plurality of radar modules, and a processor. The plurality of wireless communication modules comprise one or more antennas that are configured to transmit and receive wireless communication signals, and the plurality of radar modules comprise one or more antennas that are configured to transmit and receive radar signals. The processor is configured to determine which of the plurality of wireless communication modules are active, obtain spatial information comprising spatial positions within the device of the wireless communication modules and the radar modules, determine one or more transmission characteristics of the active wireless communication modules and the radar modules, determine a set of the plurality of radar modules to activate based on the spatial information and the transmission characteristics, and activate the determined set of radar modules.

In another embodiment, a method for managing activation of radar modules of a wireless communication device is provided. The method includes determining which of a plurality of wireless communication modules of the wireless communication device are active, obtaining spatial information comprising spatial positions within the device of the wireless communication modules and a plurality of radar modules of the wireless communication device, determining one or more transmission characteristics of the active wireless communication modules and the radar modules, determining a set of the plurality of radar modules to activate based on the spatial information and the transmission characteristics, and activating the determined set of radar modules.

In another embodiment, a non-transitory computer-readable medium is provided. The non-transitory computer-readable medium is configured to store instructions that, when executed by a processor, cause the processor to determine which of a plurality of wireless communication modules of the device are active, obtain spatial information comprising spatial positions within the device of the wireless communication modules and a plurality of radar modules of the device, determine one or more transmission characteristics of the active wireless communication modules and the radar modules, determine a set of the plurality of radar modules to activate based on the spatial information and the transmission characteristics, and activate the determined set of radar modules.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented to include higher frequency (mmWave) bands, such as 28 GHz or 60 GHz bands or, in general, above 6 GHz bands, so as to accomplish higher data rates or, in lower frequency bands, such as below 6 GHz, to enable robust coverage and mobility support.

The present disclosure relates generally to 5G wireless communication systems. Aspects of the present disclosure may also be applied to deployment of 5G communication systems, 6G, or even later releases which may use terahertz (THz) bands. A communication system includes a downlink (DL) that conveys signals from transmission points such as base stations (BSs), eNodeBs (eNBs), or gNodeBs (gNBs) to user equipments (UEs) and an uplink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology. To decrease propagation loss of the radio waves and increase the transmission distance, beamforming, massive multiple-input multiple-output (MIMO), full dimensional MIMO (FD-MIMO), array antenna, and analog beam forming, large scale antenna techniques are discussed in 5G/NR communication systems.

A 5G terminal or UE can be equipped with multiple antenna elements. There can also be one or more antenna modules fitted on the terminal, where each module can include one or more antenna elements. Beamforming is an important factor when a UE tries to establish a connection with a BS. To compensate for the narrower analog beamwidth in mmWave, analog beam sweeping can be employed to enable wider signal reception or transmission coverage for the UE.

Figure 3:
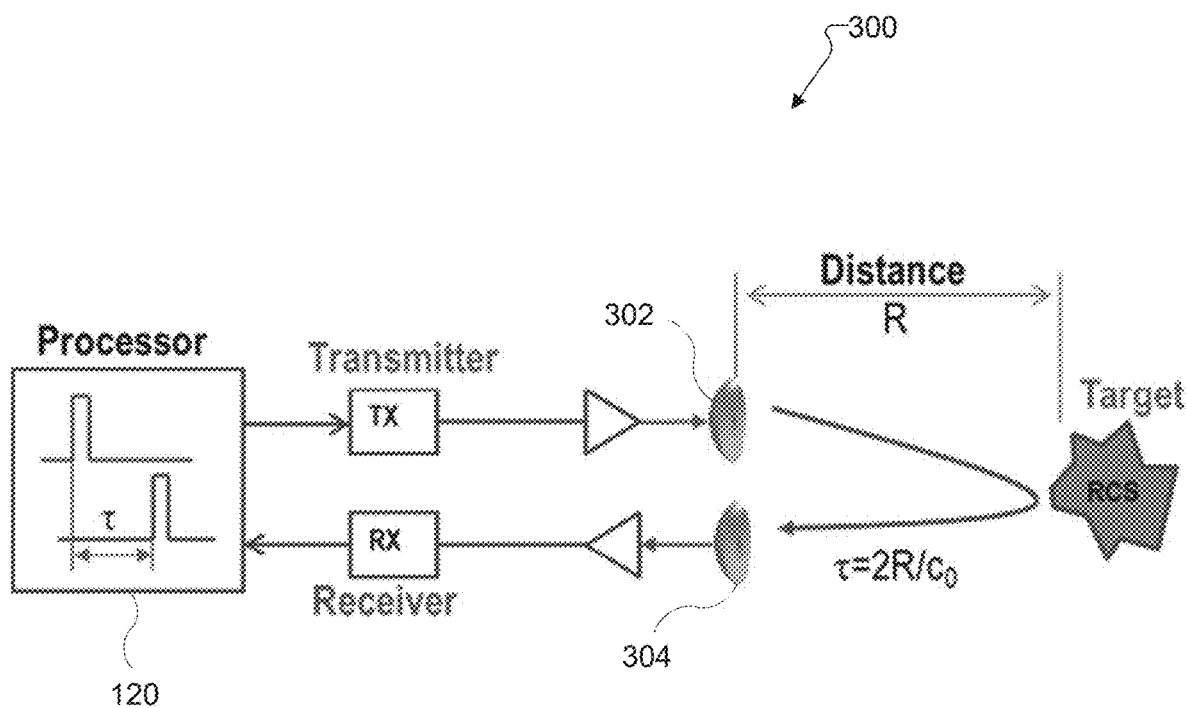
FIG. 3 illustrates an example monostatic radar architecture according to embodiments of the present disclosure.

A 5G terminal or UE can also be equipped with radar. A common type of radar is the "monostatic" radar, characterized by the fact that the transmitter of the radar signal and the receiver for its delayed echo are, for all practical purposes, in the same location. FIG. 3, discussed further below, illustrates the high-level architecture of a monostatic radar. The transmitter and receiver are either co-located (by using a common antenna) or nearly co-located (using separate, but adjacent antennas). Monostatic radars are assumed coherent, i.e., the transmitter and receiver are synchronized via a common time reference.

Embodiments of the present disclosure recognize that in order to provide robustness against blockage and for better spherical coverage, multiple antenna modules (or panels) can be placed on a mobile device for communication. This is particularly true for high frequency (mmWave or THz) communication, as the nature of such communication is highly directional and a module placed on one side of the device cannot cover the whole sphere. The directional communication from a module is based on beamforming, i.e., the process of adjusting the weights of the antenna elements so as to have high gain in one particular direction.

Embodiments of the present disclosure further recognize that directional communication through beamforming brings up the concern of exposing the user to excessive RF radiation. One solution to avoid the excess exposure problem, also called maximum permissible exposure (MPE) violation, is to detect the presence of human tissue near the communication module, and then adjust the transmission so as to avoid high exposure. The detection mechanism can be based on a radar that transmits with relatively low power and, if tissue (or an object) is detected, the transmission of the communication system is adjusted to avoid high exposure. If, however, there are multiple antenna modules for mmWave communication on the device, it can become necessary to include one radar module per communication module to detect the potential RF exposure of each particular module.

Although RF exposure detection is one motivation for using multiple radar modules on a device, embodiments of the present disclosure recognize that there can be other reasons to have multiple radar modules, e.g., depending on the field of view (FoV) of a given radar module and the desired FoV, it might be necessary to use multiple radar modules to cover the desired FoV.

Accordingly, embodiments of the present disclosure consider the case of multiple radar and communication modules on a wireless communication device. There are several possibilities of having communication and radar operation together, e.g., sharing the same hardware, and even the same waveform to share the time-frequency resources. Different such possibilities provide different tradeoffs between implementation complexity and advantages in terms of joint use of limited resources such as spectrum and space budget. Although the ideas presented in this disclosure can be used for systems where the radar and communication systems share hardware, this disclosure focuses primarily on the case where dedicated hardware is used for each of the radar and communication systems.

Furthermore, in the embodiments of the present disclosure, both the communication and radar modules are capable of transmit and receive beamforming. The embodiments of the present disclosure consider cases in which the radar and communication operation happens simultaneously, and the frequencies of operation of the radar and communication systems either have full overlap, partial overlap, or occupy adjacent spectrum, so that the simultaneous operation creates interference (e.g., inter-system interference). The assumption for radar and communication systems to share part of the spectrum is typical and is the basis of effective spectrum utilization when both radar and communication systems are implemented.

Embodiments of the present disclosure recognize that when the frequency of operation of radar and communication systems is such that simultaneous operation causes interference, it is important to effectively operate the radar modules while avoiding interference to the communication modules. Accordingly, embodiments of the present disclosure provide multiple solutions for the simultaneous operation of the radar and communication modules. Specifically, the embodiments in this disclosure provide methods to effectively operate the radar modules while avoiding interference to the communication modules. Although these embodiments are disclosed as dealing with interference avoidance for simultaneous operation of radar and communication systems, the embodiments may apply to any two systems operating at the same time with the potential for interference, e.g., two communication systems operating in partially or fully overlapping frequencies.

Figure 1:
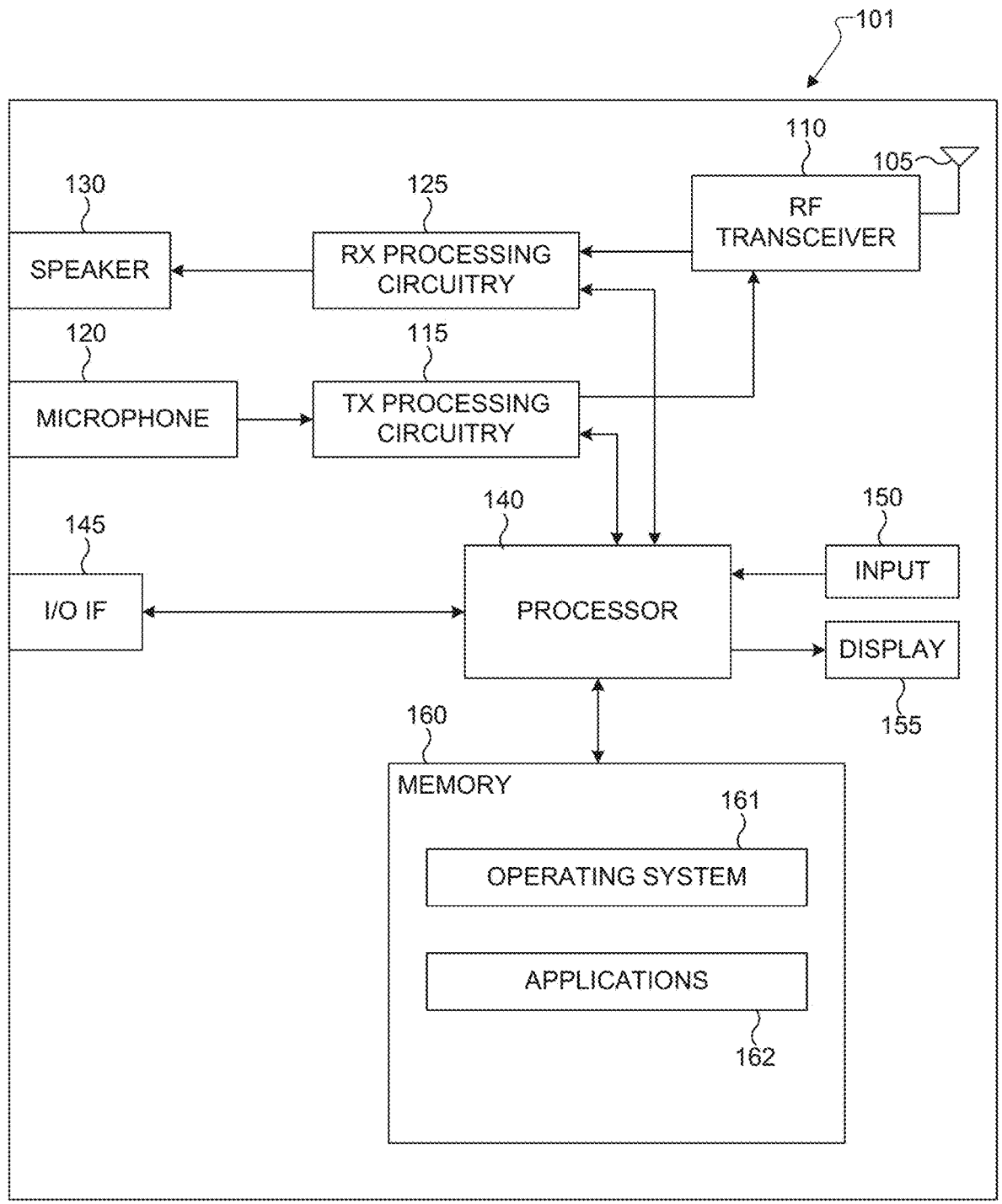
FIG. 1 illustrates an example electronic device according to embodiments of the present disclosure.

FIG. 1 illustrates an example electronic device 101 according to embodiments of the present disclosure. For ease of explanation, this disclosure will discuss the electronic device 101 as a UE, however the electronic device 101 of FIG. 1 could be a BS, eNB, gNB, or any other suitable wireless communication device having a same or similar configuration. Furthermore, UEs come in a wide variety of configurations, and FIG. 1 does not limit the scope of this disclosure to any particular implementation of a UE.

As shown in FIG. 1, the UE 101 includes antenna, radio frequency (RF) transceiver 110, transmit (TX) processing circuitry 115, a microphone 120, and receive (RX) processing circuitry 125. The UE 101 also includes a speaker 130, a processor 140, an input/output (I/O) interface 145, a touchscreen 150, a display 155, and a memory 160. The memory 160 includes an operating system (OS) 161 and one or more applications 162.

The RF transceiver 110 receives, from the antenna 105, an incoming RF signal. The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

In various embodiments, the RF signals transmitted and received via the antenna 105 can be wireless communication signals or radar signals. The antenna 105 may, in such cases, represent multiple antenna arrays, of which some antenna arrays are dedicated to transmitting and receiving wireless communication signals (which may be referred to as wireless communication antenna modules, or simply as wireless communication modules) and some are dedicated to transmitting and receiving radar signals (which may be referred to as radar antenna modules, or simply as radar modules). Furthermore, the RF transceiver 110 may represent separate RF transceivers dedicated to wireless communications and radar signals, respectively. Example architectures of such cases are described further herein below.

The processor 140 can include one or more processors or other processing devices and execute the OS 161 stored in the memory 160 in order to control the overall operation of the UE 101. For example, the processor 140 could control the reception of DL channel signals and the transmission of UL channel signals by the RF transceiver 110, the RX processing circuitry 125, and the TX processing circuitry 115 in accordance with well-known principles. In some embodiments, the processor 140 includes at least one microprocessor or microcontroller.

The processor 140 is also capable of executing other processes and programs resident in the memory 160, such as processes for determining which radar modules to activate, and constraining operation of radar modules. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the UE 101 with the ability to connect to other devices, such as laptop computers and handheld computers. The I/O interface 145 is the communication path between these accessories and the processor 140.

The processor 140 is also coupled to the touchscreen 150 and the display 155. The operator of the UE 101 can use the touchscreen 150 to enter data into the UE 101. The display 155 may be a liquid crystal display, light emitting diode display, or other display capable of rendering text and/or at least limited graphics, such as from web sites.

The memory 160 is coupled to the processor 140. Part of the memory 160 could include a random access memory (RAM), and another part of the memory 160 could include a Flash memory or other read-only memory (ROM).

Although FIG. 1 illustrates one example of UE 101, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the UE 101 configured as a mobile telephone or smartphone, UEs could be configured to operate as other types of mobile or stationary devices.

Figure 2:
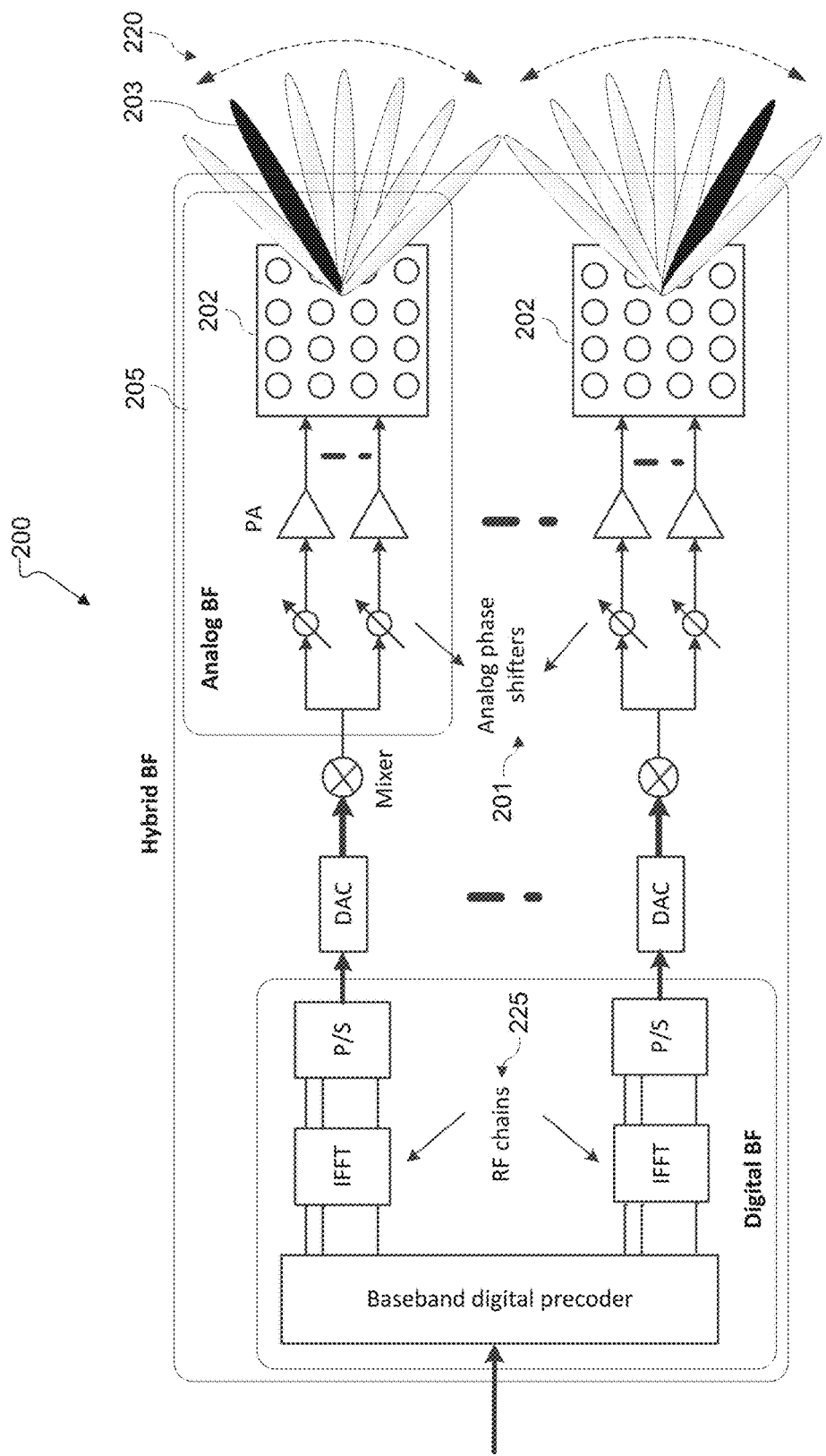
FIG. 2 illustrates a block diagram of example hybrid beamforming (BF) hardware according to embodiments of the present disclosure.

FIG. 2 illustrates a block diagram of example hybrid BF hardware 200 according to embodiments of the present disclosure. The hybrid BF hardware 200 is implemented in the electronic device 101 of FIG. 1. For ease of explanation, this disclosure will discuss the electronic device 101 as a UE. However, it is understood that any other beamforming-capable wireless communication device, such as a BS, could include hybrid BF hardware 200.

For mmWave band devices, although the number of antenna elements can be large for a given form factor, the number of digitally precoded ports—which can correspond to the number of digital RF chains 225—tends to be limited due to hardware constraints (such as the feasibility of installing a large number of ADCs or DACs at mmWave frequencies) as illustrated in FIG. 2.

In this case, one digital RF chain 225 is mapped onto a large number of antenna elements which can be controlled by a bank of analog phase shifters 201. One digital RF chain 225 can then correspond to one antenna sub-array 202 (which could correspond to an antenna module 197) which produces a narrow analog beam 203 through analog beamforming 205. This analog beam 203 can be configured to sweep across a wide range of angles 220 by varying the phase shifter bank 201 across a transmission time interval.

A BS could utilize one or multiple transmit beams to cover the whole area of one cell. The BS may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for BS to provide coverage with a single transmit beam, i.e., to ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the BS may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the BS may form receive beams.

To assist the UE in determining its receive and/or TX beam, a beam sweeping procedure is employed consisting of the BS transmitting a set of transmit beams to sweep the cell area and the UE measuring the signal quality on different beams using its receive beams. To facilitate candidate beam identification, beam measurement and beam quality reporting, the BS configures the UE with one or more reference signal (RS) resources (e.g., synchronization signal (SS) Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the BS configures the UE with one or more Transmission Configuration Indicator (TCI) states for reception of PDCCH and/or PDSCH.

Although FIG. 2 illustrates one example of hybrid BF hardware 200, various changes may be made to FIG. 2. For example, various components in FIG. 2 could be combined, further subdivided, or omitted and additional components could be added according to particular needs.

FIG. 3 illustrates an example monostatic radar architecture 300 according to embodiments of the present disclosure. The monostatic radar architecture 300 is implemented in the electronic device 101 of FIG. 1. For the purposes of this disclosure, it is assumed that the electronic device 101 is a UE. However, it is understood that any other wireless communication device could include monostatic radar architecture 300.

In this example, the transmitter 302 and receiver 304 are either co-located (e.g., using a common antenna) or nearly co-located (e.g., using separate, but adjacent antennas). For example, the transmitter 302 and 304 could be implemented using one antenna element of an antenna module 197 (or one antenna element of an antenna sub-array 202), or using two adjacent antenna elements of an antenna module 197 (or two adjacent antenna elements of an antenna sub-array 202). As discussed above, the monostatic radar is coherent, i.e., the transmitter 302 and receiver 304 are synchronized via a common time reference.

The radar can be used to detect the range, velocity and/or angle of a target. Operating at mmWave frequency with GHz of bandwidth (e.g. 2, 3, 5 or 7 GHz bandwidth), the radar can be useful for applications such as proximity sensing, gesture recognition, liveness detection, mmWave blockage detection, and so on.

Although FIG. 3 illustrates one example of monostatic radar architecture 300, various changes may be made to FIG. 3. For example, various components in FIG. 3 could be combined, further subdivided, or omitted and additional components could be added according to particular needs.

Figure 4A:
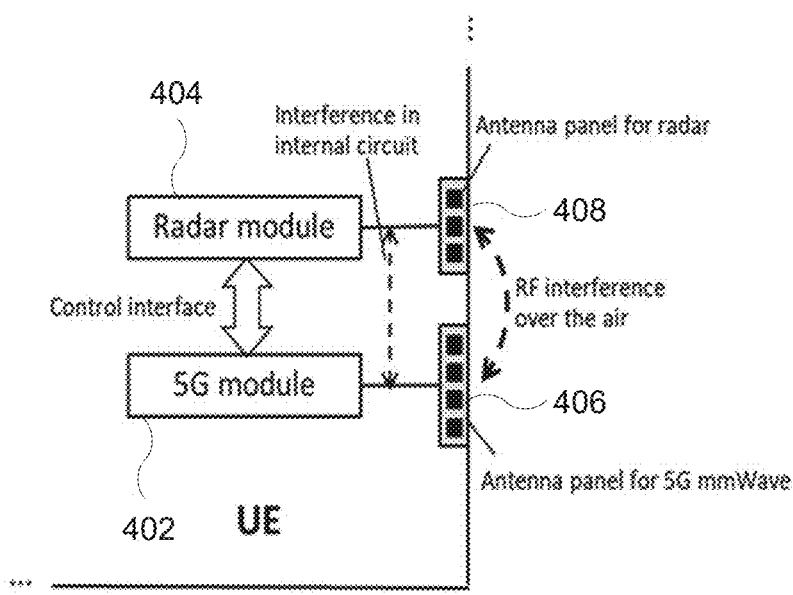
FIGS. 4A and 4B illustrate example architectures of a wireless communication device with both a wireless communication module and a radar module according to embodiments of the present disclosure.
Figure 4B:
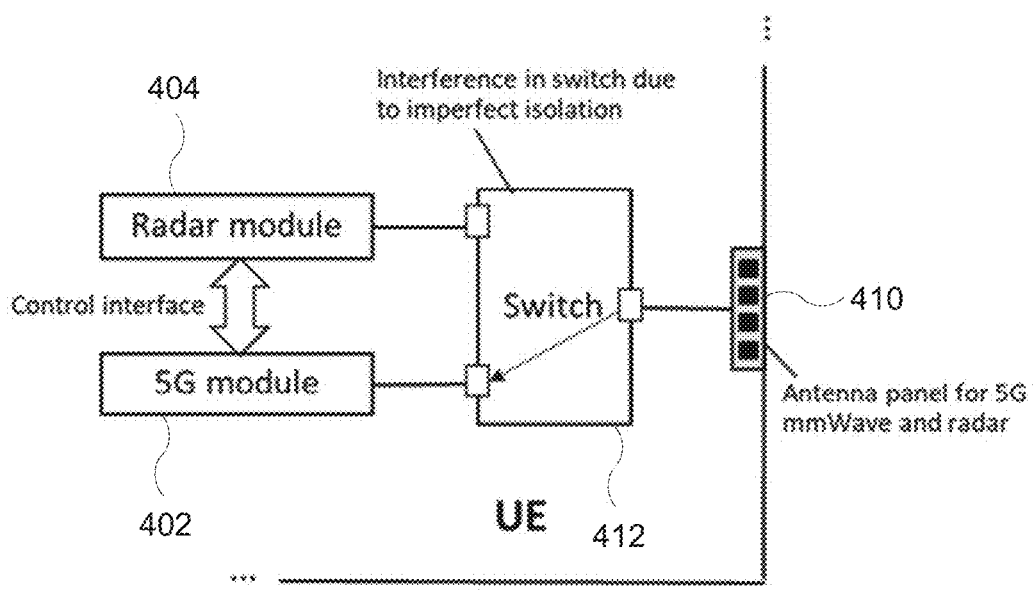

FIGS. 4A and 4B illustrate example architectures of a wireless communication device with both a wireless communication module and a radar module according to embodiments of the present disclosure. In both architectures, there is inter-system interference due to a lack of RF isolation between the wireless communication system and the radar system. It is assumed in the below disclosure that the illustrated examples are examples of an electronic device 101 of FIG. 1, and that the electronic device 101 is a UE. However, it is understood that any other wireless communication device could include the illustrated architecture. Furthermore, it is assumed in the below disclosure that the wireless communication module is configured for 5G communications, however, it is understood that the wireless communication module may be configured for any other suitable communication protocol.

FIG. 4A illustrates an architecture with separate antenna modules (or panels) for the 5G wireless communication module 402 and the radar module 404. Specifically, antenna module 406 is associated with the 5G wireless communication module 402, and antenna module 408 is associated with the radar module 404. In this architecture, there is inter-system interference between the internal circuitry of each of the modules.

FIG. 4B illustrates an architecture with a common antenna module (or panel) 410 for both the 5G wireless communication module 402 and the radar module 404. In both architectures, there is inter-system interference due to a lack of RF isolation between the wireless communication system and the radar system. In this architecture, there is inter-system interference in a switch 412 that facilitates the use of the common antenna module 410 for both systems.

Although FIGS. 4A and 4B illustrate two examples of architectures of a wireless communication device with both a wireless communication module and a radar module, various changes may be made to FIGS. 4A and 4B. For example, various components in FIGS. 4A and 4B could be combined, further subdivided, or omitted and additional components could be added according to particular needs.

As noted above, when the frequency of operation of radar and communication systems is such that simultaneous operation causes interference, e.g., partial overlap, full overlap, or adjacent spectrum, it is important to effectively operate the radar modules while avoiding interference to the communication modules. Accordingly, embodiments are provided below with the objective of reducing or minimizing the interference to communication modules while maximizing the FoV of operations of radar modules during simultaneous operation of both systems.

The benefit of the embodiments discussed herein is that the simultaneous operation of the radar and communication modules does not require waveform-level coordination between the two systems, since this can be hard to achieve from a practical implementation point of view. Even if such coordination is achieved, acceptable performance for both systems may not be achieved, e.g., the time-frequency resources not consumed by the communication system and hence used by the radar may not be sufficient, or the time-frequency pattern may not be suitable, to achieve desired radar detection/estimation performance. The benefit of the disclosed embodiments is that they provide a simple and practical method of simultaneous radar and communication operation in multi-module systems.

In the embodiments discussed herein below, there are K communication modules operating at mmWave frequencies. For ease of explanation, it is assumed that there are also K radar modules, however, it is understood that the below embodiments can be used with more or fewer radar modules than communication modules. Each module in the device may be active (i.e., actively transmitting or receiving) or inactive (i.e., not transmitting or receiving). The indices of active mmWave communication modules $1, \ldots, K$ are collected in a set $\mathcal{C}$. Similarly, the indices of active radar modules $1, \ldots, K$ are collected in a set $\mathcal{R}$. In this notation system it is assumed that the communication module is located next to the radar module, or that the communication module and the $i^{th}$ radar module are physically facing the same direction. The set of the indices of all communication modules is $\mathcal{K} = \{1, 2, \ldots, K\}$.

Figure 5:
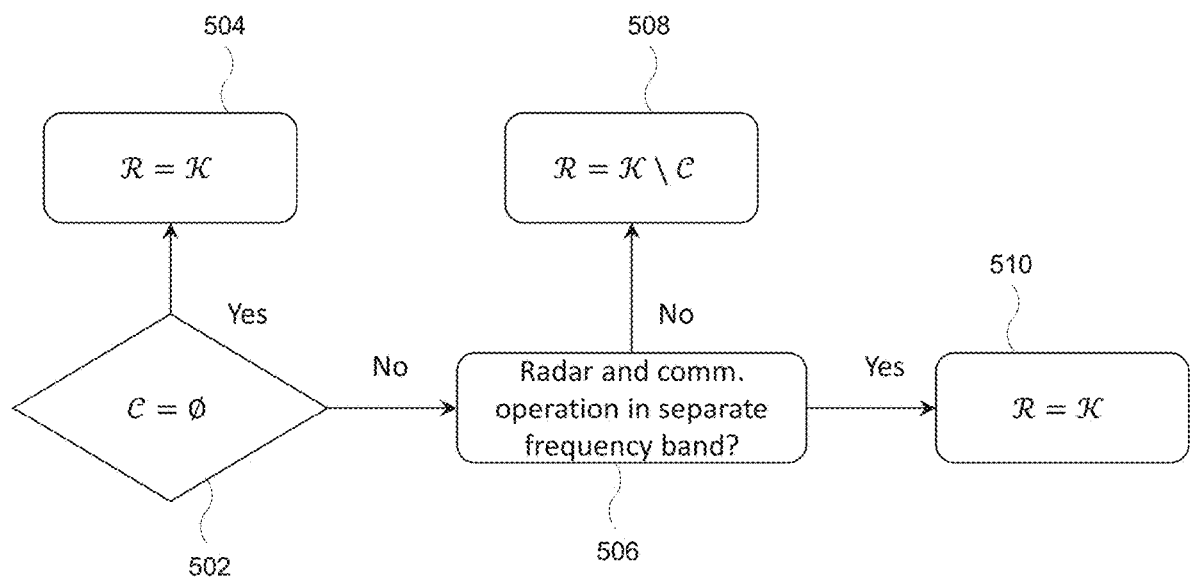
FIG. 5 illustrates an example process for determining which radar modules of a device to activate according to embodiments of the present disclosure.

FIG. 5 illustrates an example process for determining which radar modules of a device to activate according to embodiments of the present disclosure. For ease of explanation, it is assumed that the process of FIG. 5 is applied to antenna modules in a UE 101. However, it is understood that the process could be applied to any suitable wireless communication device. In the process of FIG. 5, radar modules are selected for activation based on whether the radar and communication operations are sufficiently separated in frequency to avoid an interference issue.

Initially, at block 502, it is determined whether the set $\mathcal{C}$ is empty (i.e., whether there are no active communication modules). For example, if there is not sufficient link margin at mmWave frequencies, or if temperature concerns in the device require the mmWave communication modules to be completely turned off, then it is possible for the device to not operate with any mmWave communication modules. In this case, the device operates with sub-6 GHz communication, and as such $\mathcal{C}=\emptyset$. If all mmWave communication modules in the device are inactive, then all of the radar modules in the device can be used for sensing (block 504) without causing any interference to the communication system, since the radar modules operate at mmWave frequencies.

If the set $\mathcal{C}$ is not empty, then selection of the set of active radar modules $\mathcal{R}$ depends on the respective operation frequency bands of the communication and radar systems. There are many possible scenarios for overlap between the spectra of the two systems, e.g., complete overlap, partial overlap, non-overlapping but adjacent, slightly separated, etc., these are abstracted for the purposes of this disclosure into two groups: first, shared spectra, and second, significantly separated spectra. At block 506, it is determined which of these two groups of scenarios the device is in.

In the first group of scenarios, the communication and radar systems share the spectrum, which means that either there is partial or full overlap, or the spectrum used by the two systems is close enough that if the radar and communication systems are active (i.e., operational) at the same time it is possible for the radar to interfere with the communication signals. In this case, with a non-empty set $\mathcal{C}$, the set difference $\mathcal{R}=\mathcal{K}\setminus\mathcal{C}$ gives the radar modules that are available for sensing (block 508). That is, only radar modules that are not spatially located next to an active communication module (or physically facing the same direction as an active communication module) can be activated for sensing.

Figure 6:
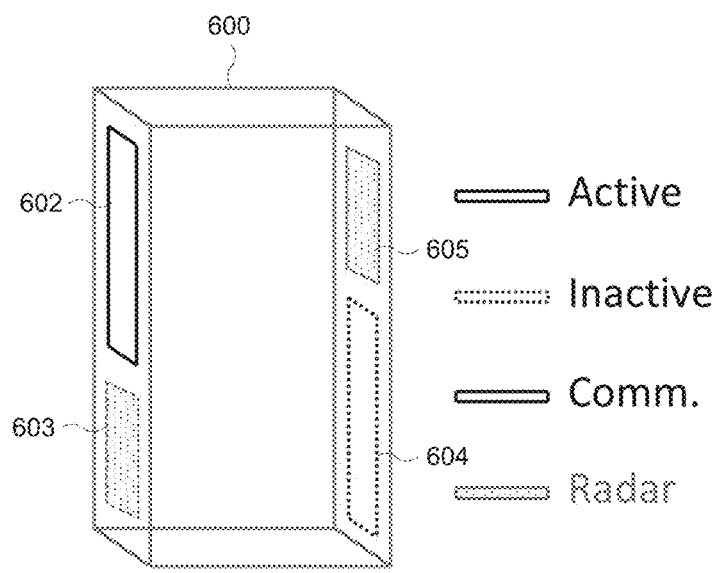
FIG. 6 illustrates an example device according to a scenario of FIG. 5.

An example of this scenario is shown in FIG. 6, which illustrates an example device 600 having a communication module 602 that is spatially next to (and physically facing the same direction as) a radar module 603, and a communication module 604 that is spatially next to (and physically facing the same direction as) a radar module 605. The communication module 602 is active, and accordingly the adjacent radar module 603 is inactive (i.e., it is not included in $\mathcal{R}$). The communication module 604, however, is inactive, and so the radar module 605 is able to be active (i.e., it is included in $\mathcal{R}$). In other words, if the communication module 602 on the left side of the device 600 is active, then the radar module 605 on the right side of the device can be active so as to avoid interference, and vice versa.

Returning to the process of FIG. 5, in the second group of scenarios, there is enough separation between the spectra used by the two systems that even if the radar and communication modules are active at the same time they cannot interfere. In this case, if the frequency bands for the radar and communication modules are sufficiently separated to not have an interference issue, then all of the radar modules can be activated for all sensing applications regardless of the set $\mathcal{C}$ (block 510).

Figure 7:
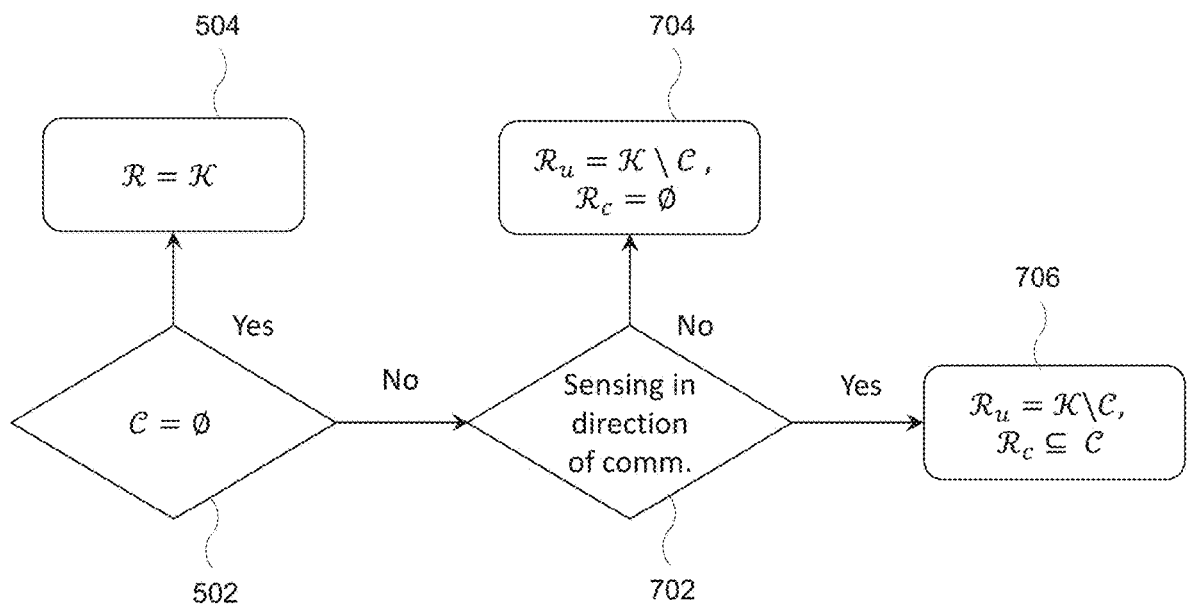
FIG. 7 illustrates another example process for determining which radar modules of a device to activate according to embodiments of the present disclosure.

FIG. 7 illustrates another example process for determining which radar modules of a device to activate according to embodiments of the present disclosure. It is assumed that the process of FIG. 7 is applied to antenna modules in a UE 101. However, it is understood that the process could be applied to any suitable wireless communication device. In the process of FIG. 7, even though the radar and communication systems operate through spectra that have some overlap (or the operational frequency bands are close enough to cause some out-of-band interference), the radar and communication operations can be achieved simultaneously using radar and communication modules physically facing the same direction. To do so, an unconstrained set $\mathcal{R}_u$ of radar modules and a constrained set $\mathcal{R}_c$ of radar modules are determined based on whether radar sensing is desired in the same direction as communication is performed.

The first step of this process is identical to first step of the process of FIG. 5 (at block 502), in which if the communication module set $\mathcal{C}$ is empty, then all radar modules can be used for sensing purposes (at block 504). Subsequently, the process determines whether radar sensing operations are desired in the same direction as communication (block 702). Based on this determination, two types of radar modules are identified: unconstrained and constrained.

The unconstrained radar modules are grouped into the unconstrained set $\mathcal{R}_u$. These are radar modules that can operate unconstrained, meaning that operation of the communication modules in the device does not pose any constraint on these radar modules. Specifically, this is the case when communication modules are inactive in the directions that these radar modules face. Accordingly, the unconstrained set is represented by $\mathcal{R}_u=\mathcal{K}\setminus\mathcal{C}$.

The constrained radar modules are grouped into the constrained set $\mathcal{R}_c$. These are the radar modules that are constrained in their operation because of communication modules that are active in the same directions that these radar modules face. If radar sensing operations are not desired in the same direction as any of the active communication modules face, then $\mathcal{R}_c=\emptyset$ (i.e., there are no constrained radar modules). The combination of unconstrained and constrained radar modules in this case is represented at block 704. If, however, radar sensing operations are desired in the direction of active communication modules, then $\mathcal{R}_c\subseteq\mathcal{C}$ (i.e., radar modules that are spatially located next to an active communication module, or that face the same direction as an active communication module, are constrained). The combination of unconstrained and constrained radar modules in this case is represented at block 706. As one particular example, if radar sensing operations are desired in the direction of all active mmWave communication modules, then $\mathcal{R}_c=\mathcal{C}$.

The conditions for determining whether radar sensing is desired in the direction of communication can be based on the radar sensing application and scenario. Table 1 includes some example combinations of application and scenario. For the purposes of the present disclosure, three example applications are illustrated: MPE violation detection, gesture recognition, and room sensing. MPE violation detection is the use of radar sensing to detect an object (which can potentially be a human tissue) very close to the radar module, as a result of which the communication system parameters are adjusted to ensure that MPE is below the limit. Gesture recognition is the process of detecting a gesture performed by a human as a mechanism to interact with the device. Room sensing includes, but is not limited to, detecting the presence of living beings (e.g., pets and humans) in the room where the device is located. Room sensing could also include mapping out the position of different objects in the room, determining the layout of the room, and even detecting objects within the room. The example in Table 1 is limited to detecting the presence of living beings (e.g., pets and humans) for the purposes of illustration.

TABLE 1

| Application | Example scenario for activating radar in the direction of communication |
|---|---|
| MPE violation detection | Always on for uplink communications - MPE violation detection requires radar sensing in the direction of active communication modules during uplink transmissions. |
| Room sensing | If it is detected by the radar system that there is a living being in the direction of an active communication module, its tracking might require sensing in the direction of the communication. The detection of a living being in the direction of active communication modules can be based on a prior time, when the currently active communication module was inactive. |
| Gesture recognition | The limited FoV in the direction of communication modules (as will be discussed further below) implies that there could be challenges in getting reliable gesture detection in the direction of active communication modules. Activity or proximity detection, however, typically precedes gesture detection, e.g., to turn on the gesture detection module. Using radar sensing in the direction of an active communication module to perform activity or proximity detection, the output of the activity or proximity detection can be used to inform the user to perform the gesture on a different side of the device instead (i.e., a side of the device with inactive communication modules). |

Figure 8A:
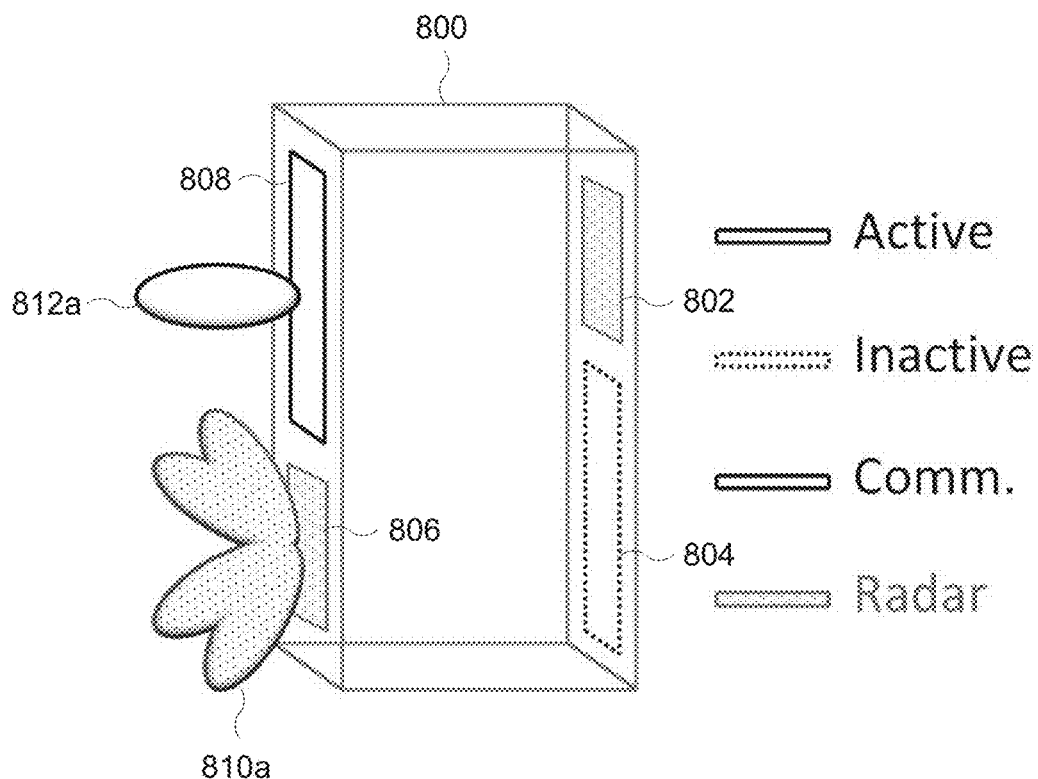
FIGS. 8A and 8B illustrate one example of constrained operation of radar modules according to various embodiments of the present disclosure.
Figure 8B:
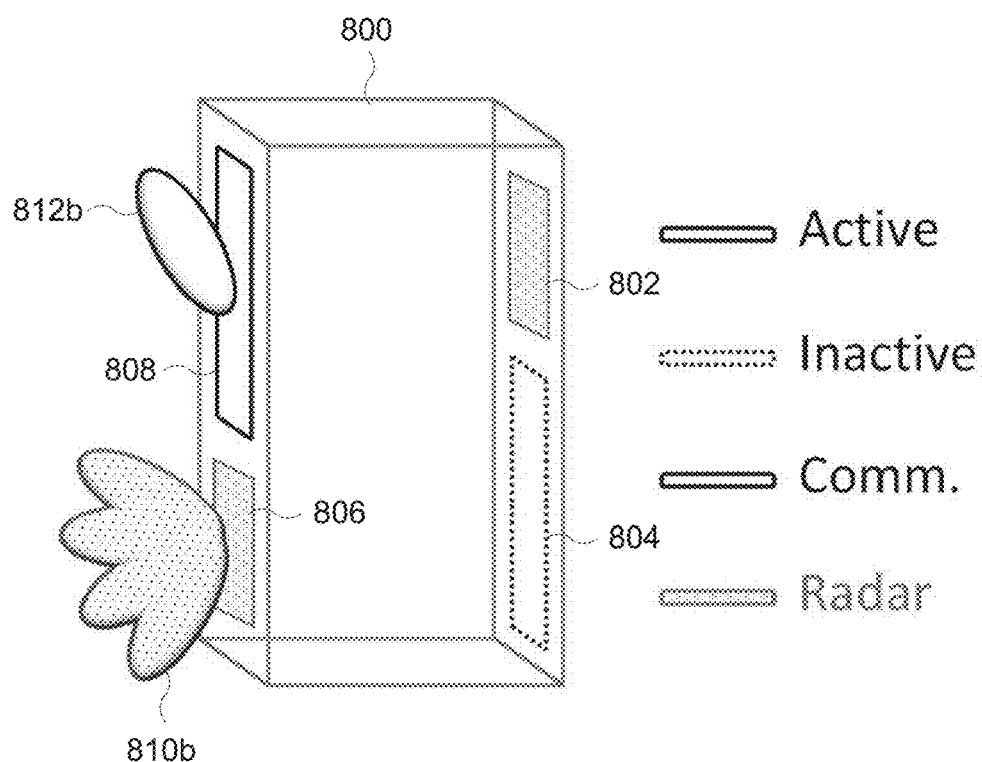

The constraints placed on operation of the radar modules in the constrained set $\mathcal{R}_c$ may vary. FIGS. 8A and 8B illustrate one example of constrained operation of radar modules according to various embodiments of the present disclosure. In this example, the radar modules in the constrained set $\mathcal{R}_c$ operate through a complementary beam—i.e., they transmit radar in directions that are not covered by the communication beam (or beams) transmitted by the adjacent active communications module.

In both FIGS. 8A and 8B, the radar module 802 on the right side of the device 800 can operate in an unconstrained fashion (i.e., the radar module is part of the unconstrained set $\mathcal{R}_u$) because the adjacent communication module 804 is inactive. The operation of the radar module 806 on the left side of the device 800 is constrained (i.e., the radar module is part of the constrained set $\mathcal{R}_c$) because the adjacent communication module 808 is active. The radar operation for the constrained radar module 806 in the same direction as the communication module 808 can happen through a complementary beam (or beams) 810a or 810b. The complementary beam 810a or 810b is considered complementary to the corresponding communication beam 812a or 812b.

A complementary beam may be defined as follows. First, it is assumed that a mmWave beam-management (BM) protocol is in place and a suitable beam for communication has been found (e.g., beam 812a or 812b). The sampled grid of the azimuth and elevation angles (θ,ϕ) is collected in a FoV set $\mathcal{F}$. The sampled grid can be obtained offline using a computer program and can be stored in a mobile device. Subsequently, the coverage region of the currently active communication beam n∈ 1, 2, . . . , N is denoted as $\mathcal{A}_n \subset \mathcal{F}$. The coverage region is defined as the area where the beam gain is at least X dBi, where X is a parameter that depends on the number of antenna elements, etc. With 5-antennas, the maximum gain can be 10 log 10(5)=6.98 dBi, assuming all 5 elements are isotropic, so a threshold value of 6 dBi can be used. For non-isotropic antenna elements, the gain of the element needs to be taken into consideration.

A complementary radar beam n is then designed to cover the area $\mathcal{F}\backslash\mathcal{A}_n$. Note that as there are N communication beams, there are N complementary radar beams—one corresponding to each communication beam. As illustrated in the examples of FIGS. 8A and 8B, the complementary radar beams 810a and 810b cover substantially all of the area that is not in the coverage region of the active communication beams 812a and 812b.

When designing complementary radar beams, if the number of transmit antennas on the radar module are of the same order as the total number of antennas in the communication module, then it is possible to design complementary beams specifically to have low gain in the region covered by the communication beam and to have high gain in the rest of the coverage region. One way to formalize this is through a similarity metric. There can be different measures of similarity of two beam patterns. In one approach, assuming that there are uniform sampling points (θ,ϕ) on the unit-sphere, the similarity score is defined as:

$$s = \sum_{(\theta,\phi)} G(\theta, \phi)B(\theta, \phi) \qquad (1)$$

where G(θ,ϕ) is the radiation pattern of one beam and B(θ,ϕ) is the radiation pattern of the second beam in linear scale. As such, for the communication system, assuming that the beam patterns are $G_1(\theta,\phi), G_2(\theta,\phi), \ldots, G_N(\theta,\phi)$ the beam pattern of the current beam in use is $G_n(\theta,\phi)$, and the complementary beam to be designed is $B_n(\theta,\phi)$, then one way to design a complementary radar beam of the communication beam n is to select the radar weights $w_n$ to maximize the following function:

$$\max_{w_n} \sum_{k=1,k\neq n}^{N} \sum_{(\theta,\phi)} G_k(\theta, \phi)B_n(\theta, \phi) - \sum_{(\theta,\phi)} G_n(\theta, \phi)B_n(\theta, \phi) \qquad (2)$$

Another way to design the complementary radar beam is to minimize the similarity, represented by:

$$\min_{w_n} \sum_{(\theta,\phi)} G_n(\theta, \phi)B_n(\theta, \phi) \qquad (3)$$

Yet another way to design the complementary radar beam is to maximize the beam gain over the region $\mathcal{F}\backslash\mathcal{A}_n$, where $\mathcal{A}_n$ is the coverage region of communication beam n:

$$\max_{w_n} \sum_{(\theta,\phi)\in\mathcal{F}\backslash\mathcal{A}_n} B_n(\theta, \phi) \qquad (4)$$

Figure 9A:
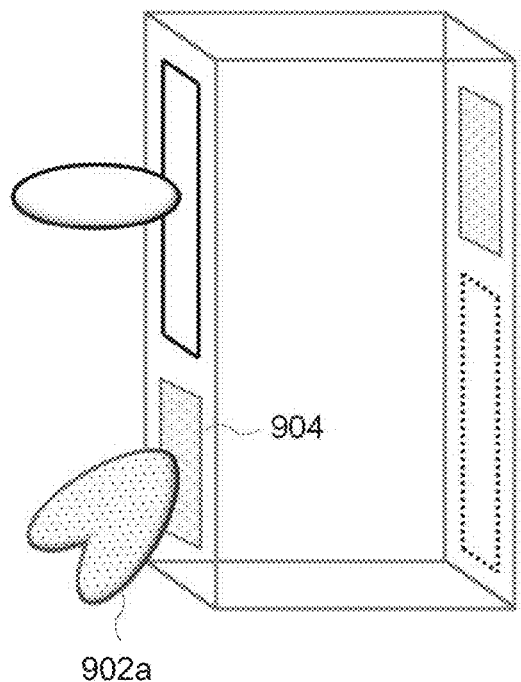
FIGS. 9A and 9B illustrate another example of constrained operation of radar modules according to various embodiments of the present disclosure.
Figure 9B:
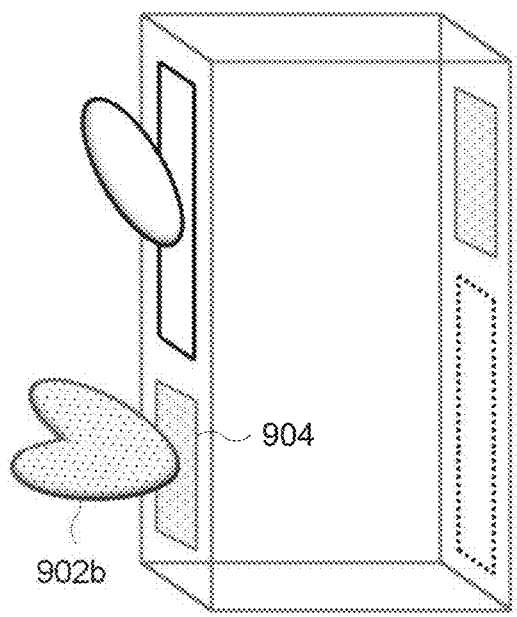

It is more likely, however, that the number of transmit antennas in the radar module is small (e.g., 2 or 3). In this case, the radar modules may only be capable of generating wide beams as compared to the communication modules. As such, it would very challenging, at best, to design radar beams that are a complete or near perfect complement of the communication beams. In this context, "near perfect complement" means a beam that has low gain in the direction of the communication beam and high gain in all other directions. In such scenarios, the radar beams should be designed primarily to avoid the coverage region of the communication beam, and then to cover the rest of the area as best as possible, even if not entirely. FIGS. 9A and 9B illustrate an example of such a scenario. The examples of FIGS. 9A and 9B are identical to those of FIGS. 8A and 8B except for the design of complementary radar beams 902*a* and 902*b*, which have less coverage area than beams 810*a* and 810*b* due to the smaller number of radar antennas in the radar module 904.

Figure 10:
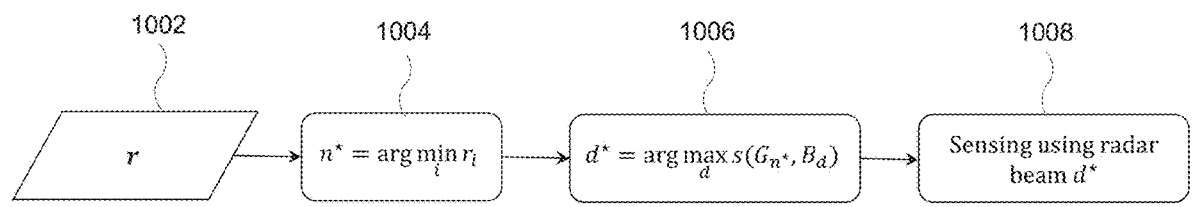
FIG. 10 illustrates another example process for determining which radar modules of a device to activate according to embodiments of the present disclosure.

FIG. 10 illustrates another example process for determining which radar modules of a device to activate according to embodiments of the present disclosure. It is assumed that the process of FIG. 10 is applied to antenna modules in a UE 101. However, it is understood that the process could be applied to any suitable wireless communication device. In the embodiment of FIG. 10, a signal quality metric obtained from the device's beam management protocol is used to select radar beams that can be used by radar modules that face the same direction as an active communication module (e.g., radar modules in the constrained set $\mathcal{R}_c$). That is, the RSRP (or some other metric of signal quality, such as SINR or signal-to-noise ratio (SNR)) determined through the beam management protocol for each of the active communication beams is used to determine which radar beam can be used without causing significant interference to the communication operation.

It is assumed that some beam-management protocol is in place for the communication system, through which the RSRP report of all communication beams is available. Once the RSRP report for the communication beams is available, the beam with the lowest RSRP denotes the direction in which the communication channel is weakest. That is, if the RSRP of the communication system is low on a given beam, this implies that the communication channel is weak in that direction. Therefore, transmitting in that direction with a radar signal (e.g., from a spatially adjacent radar module) is not likely to cause substantial interference to the communication system.

The process of FIG. 10 begins at block 1002 with an assumption that the communication module i has N beams, and the RSRP information on the beams is collected in a vector $r_i=[RSRP_1, RSRP_2, \ldots, RSRP_N]$, where $RSRP_n$ is a scalar value indicating the RSRP on the $n^{th}$ beam. Next, at block 1004, it is determined which communication beam has the lowest RSRP value, and the index n* of this beam (i.e., the index of the worst communication beam) is obtained.

At block 1006, for a set of D radar beams in the radar module i, it is determined which radar beam $B_d$ has the highest similarity with the communication beam $G_{n*}$ (i.e., the worst communication beam), where $B_d$ is shorthand for the beam pattern $B_d(\theta,\phi)$, and similarly $G_{n*}$ is shorthand for the beam pattern $G_{n*}(\theta,\phi)$. This similarity may be found, for example, using Equation (1). The index d* of the most radar similar beam is obtained as a result. Subsequently, at block 1008, the sensing operation can be performed using the radar beam corresponding to index d*. For ease of explanation, beam indices (e.g., d*, n*, etc.) may also be used to refer to the beams that corresponds to the indices.

Figure 11:
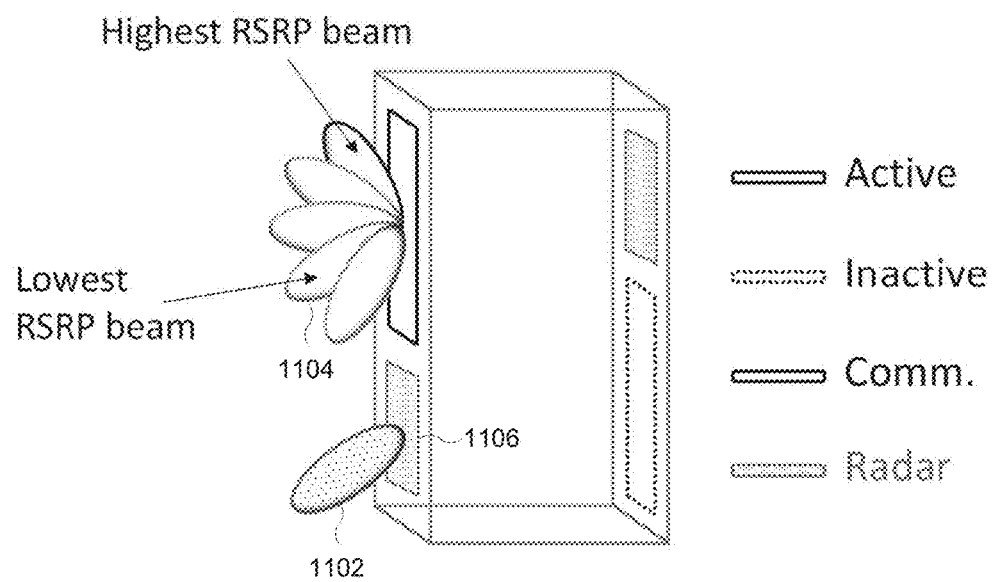
FIG. 11 illustrates an example of a special case of the process of FIG. 10.

In the special case when the number of radar transmit antennas is identical to the number of communication antennas, and the radar and communication modules use the same beam codebook, then block 1006 of the above process may be eliminated. This is because, under these special conditions, the radar beam corresponding to index n* will also be the beam that is most similar to the communication beam corresponding to index n*. FIG. 11 illustrates an example of this special case of the process of FIG. 10. The radar beam 1102 has the same features as the lowest RSRP communication beam 1104, and accordingly radar beam 1102 can be assumed to be the beam generated by radar module 1106 that is the most similar to communication beam 1104.

Furthermore, the process of FIG. 10 works well when the number of antennas in the radar module is comparable to the number of antennas in the communication module (e.g., <30% difference) and the beam-widths of the radar and communication beams are comparable. If, however, the number of antennas are substantially different (e.g., >30% difference), then because is likely that the radar module will operate with a small number of transmit antennas, some modifications to the process of FIG. 10 may be needed.

Figure 12:
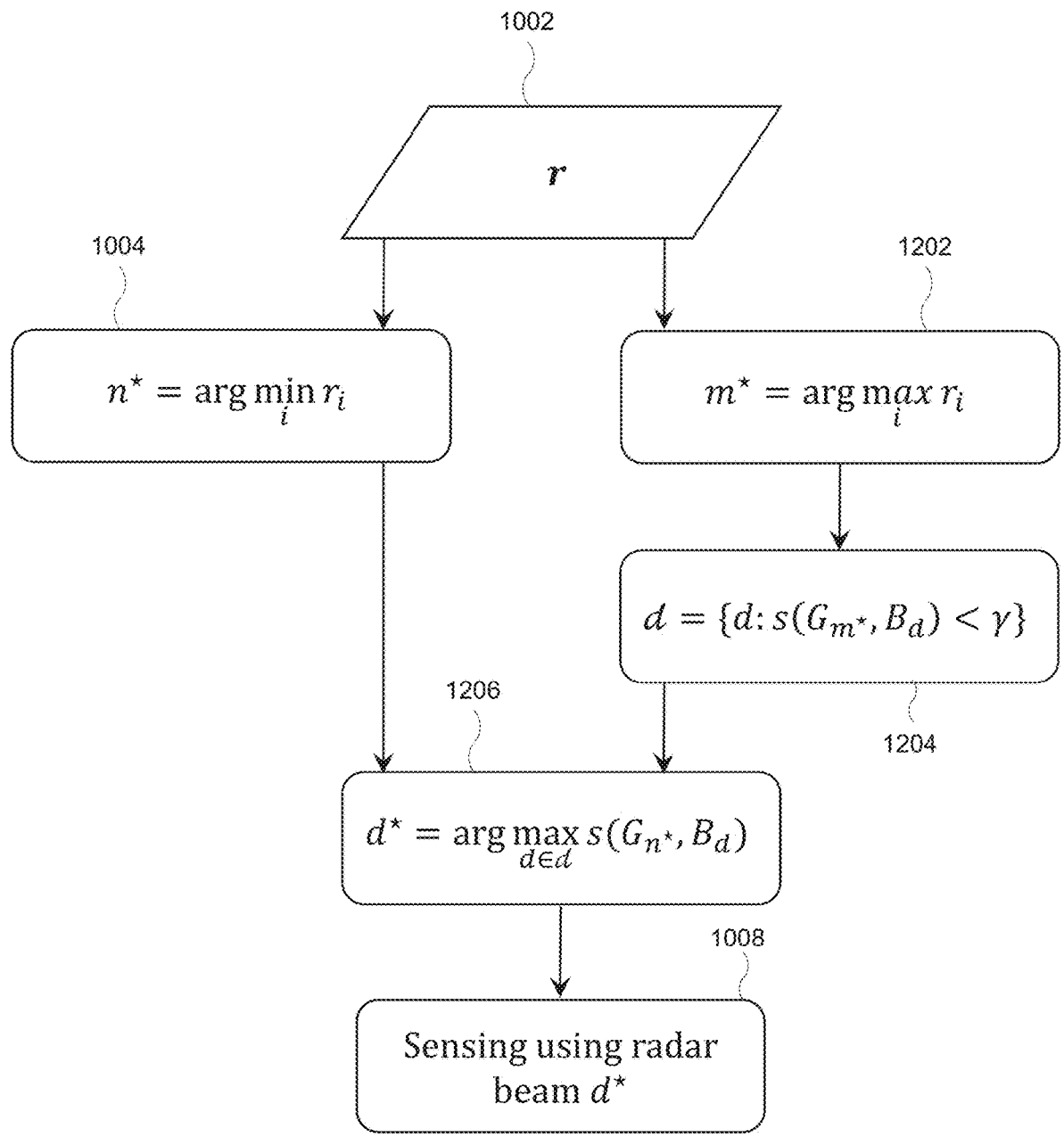
FIG. 12 illustrates an example process that is a modification of the process of FIG. 10 for determining which radar modules of a device to activate in embodiments of the present disclosure in which the number of radar transmit antennas in a radar module is small compared to the number of antennas in the communication module.

FIG. 12 illustrates an example process that is a modification of the process of FIG. 10 for determining which radar modules of a device to activate in embodiments of the present disclosure in which the number of radar transmit antennas in a radar module is small compared to the number of antennas in the communication module. Because the number of transmit antennas in the radar module is small in this scenario, the beam width of the radar beams will be large. As such, even when using the process of FIG. 10 to select a beam that has the highest similarity with the communication beam that has the lowest RSRP, there is a chance that the radar beam will still have some spatial overlap with the best communication beam (i.e., the highest RSRP communication beam) that is used for transmission and reception by the communication system, thereby causing interference.

In order to lower the chance of this situation occurring, an additional step (block 1202) can be added to the process of FIG. 10, in which the beam index m* of the communication beam with the highest RSRP is calculated. Then the indices d of radar beams that have a similarity with $G_{m*}$ smaller than a threshold y are kept in a set d (block 1204). In various embodiments, the threshold y is a parameter of the system.

It is only over this set d that the subsequent step (block 1206) of obtaining the radar beam that has a highest similarity with the lowest RSRP communication beam n* is conducted. As a result, the radar beam d* is selected not only to have good similarity with the lowest RSRP communication beam n*, but also to have high similarity with the highest RSRP communication beam m*.

Figure 13:
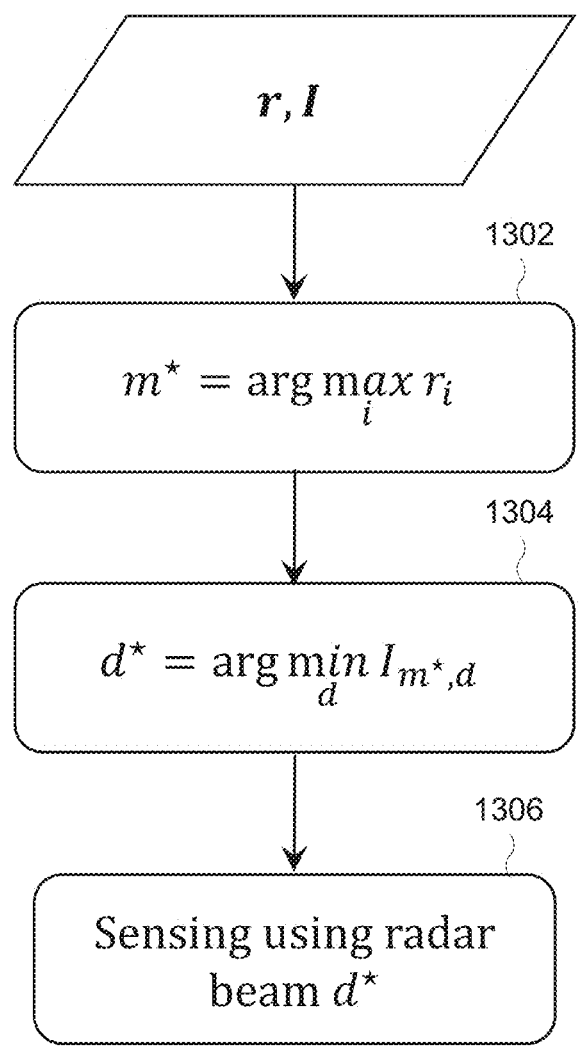
FIG. 13 illustrates another example process for determining which radar modules of a device to activate according to embodiments of the present disclosure.

FIG. 13 illustrates another example process for determining which radar modules of a device to activate according to embodiments of the present disclosure. It is assumed that the process of FIG. 13 is applied to antenna modules in a UE 101. However, it is understood that the process could be applied to any suitable wireless communication device. In the embodiment of FIG. 13, radar and communication beam codebooks of the radar and communication modules are used to pre-compute interference levels between different radar beams and communication beams. The pre-computed interference levels are then used to select radar beams that can be used by radar modules. In some embodiments, this process may be used to select radar beams for radar modules that face the same direction as an active communication module (e.g., radar modules in the constrained set $\mathcal{R}_c$).

The interference levels may be calculated based on simulations or based on measured data. In the case of using simulations, stored communication and radar beam patterns are used to calculate the interference levels. Specifically, for simulations, the interference level itself can be defined similar to the similarity metric as:

$$I_{n,d} = \frac{1}{S}\sum_{(\theta,\phi)} G_n(\theta, \phi) B_d(\theta, \phi) \qquad (5)$$

where S is the number of sampling points in the grid of the azimuth and elevation angles (θ,φ).

In the case of using measured data, the communication module operates in the reception mode and the potentially interfering radar module transmits while measurements are made. Assuming that there are N beams in the communication codebook, and D beams in the radar codebook, an N×D table I is constructed that includes the measured power received from all the radar beams to all the communication beams. Then the index of the radar beam to be selected is found using the process illustrated in FIG. 13. That is, the beam index m* of the communication beam with the highest RSRP is determined (block 1302), and subsequently the beam index d* of the radar beam that has the lowest measured interference level with the communication beam m* is determined (block 1304). The radar beam d* is selected for use in sensing applications (block 1306).

The above embodiments generally relate to scenarios in which radar modules are spatially located near communication modules in a UE 101, which is likely to be the case for applications such as MPE violation detection, where it is expected that the radar modules will be placed next to the communication modules to cover the same FoV. In order to enable other applications (e.g., gesture recognition and room sensing), radar modules can also be placed in locations on a UE 101 where there is no communication module (e.g., on top of the front of the UE to enable gesture recognition).

Figure 14:
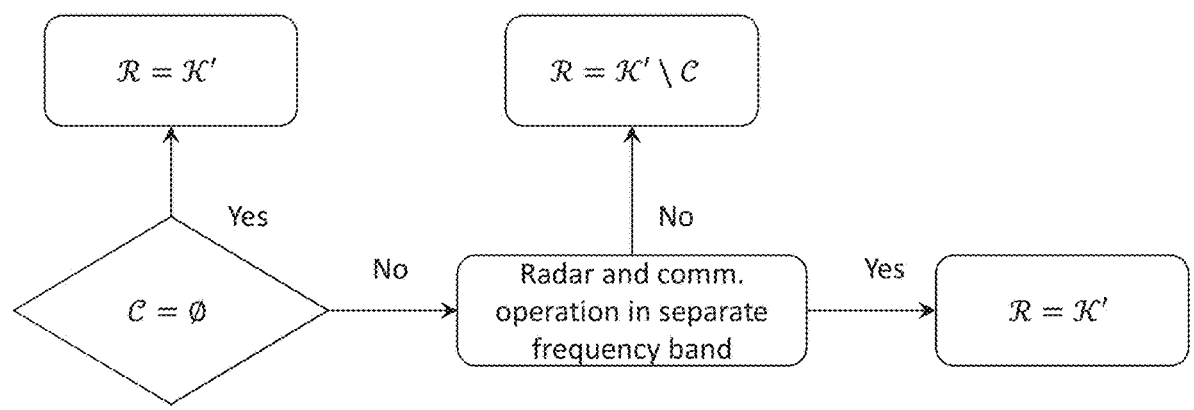
FIG. 14 illustrates an example modification of the process of FIG. 5 for cases in which radar modules are placed in locations on a device where there is no communication module.

Several of the above embodiments can be extended to this case. For example, to extend the embodiment of FIG. 5 to this case, it is first assumed that there are a total of K+L radar modules on the device, with K radar modules spatially positioned next to communication modules for MPE management and an additional L radar modules not spatially positioned next to communication modules. Now the set of all radar modules may be as $\mathcal{K}'=\mathcal{K} \cup \{K+1, \ldots, K+L\}$, where $\{K+1, \ldots, K+L\}$ is the set of indices of the radar modules that are not spatially positioned next to the communication modules. Based on this, FIG. 5 can be modified as illustrated in FIG. 14 to use $\mathcal{K}'$ in place of $\mathcal{K}$.

Figure 15:
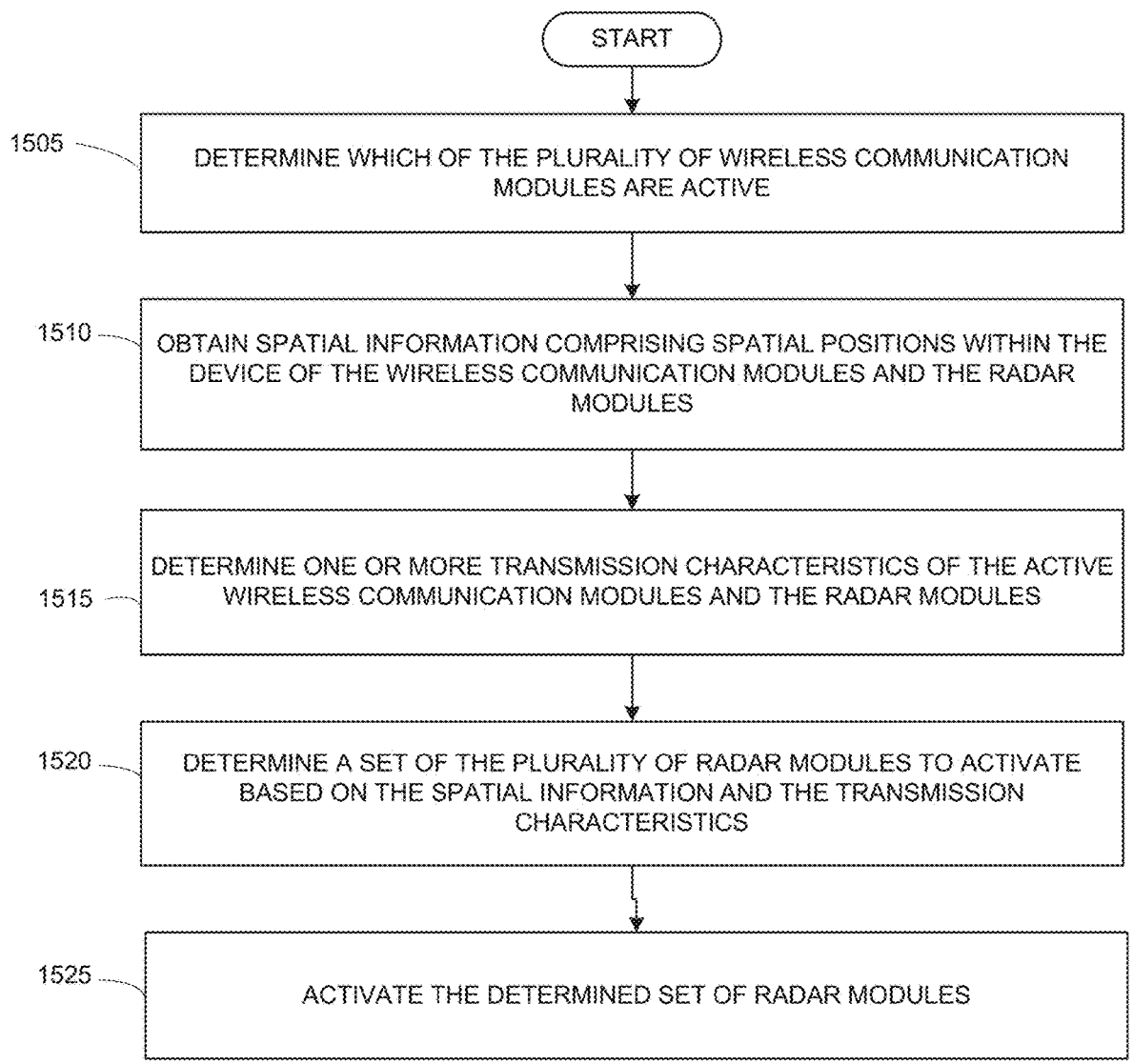
FIG. 15 illustrates a flowchart of an example method for managing activation of radar modules of a wireless communication device according to various embodiments of the present disclosure.

FIG. 15 illustrates a flowchart of an example method for managing activation of radar modules of a wireless communication device according to various embodiments of the present disclosure. The process is performed by a wireless communication device such as UE 101, which includes a processor, such as processor 140, and a plurality of antenna modules, as represented by antenna 105, which each in turn may comprise a plurality of antenna elements. The plurality of antenna modules include wireless communication modules and radar modules. The process is discussed herein below as performed by the processor of the UE 101, however it is understood that any suitable wireless communication device could perform the process.

Beginning at step 1505, the UE determines which of a plurality of wireless communication modules of the UE are active. For example, the UE may determine that a set of the wireless communication modules need to be active to perform mmWave communication with another wireless communication device such as a gNB.

Next, at step 1510, the UE obtains spatial information comprising spatial positions within the UE of the wireless communication modules and a plurality of radar modules of the UE. For example the UE may obtain information on the relative positions of the wireless communication modules and radar modules, such as which radar modules and communication modules are positioned adjacent to each other, or which radar modules and wireless communication modules physically face in the same direction.

Then, at step 1515, the UE determines one or more transmission characteristics of the active wireless communication modules and the radar modules. Subsequently, at step 1520, the UE determines a set of the plurality of radar modules to activate based on the spatial information and the transmission characteristics.

In some embodiments, step 1515 includes determining frequency bands used by the active wireless communication modules and the radar modules (e.g., determining first frequency bands used by the active wireless communication modules and second frequency bands used by the radar modules). In some such embodiments, at step 1520 the UE includes, in the set of radar modules to activate, radar modules that are not spatially positioned adjacent to one of the active wireless communication modules, based on a determination that radar signals in the second frequency bands could cause interference with communication signals in the first frequency bands. In other such embodiments, at step 1520 the UE includes all of the radar modules in the set of radar modules to activate, based on a determination that radar signals in the second frequency bands would not cause interference with communication signals in the first frequency bands.

In other embodiments, step 1515 includes determining whether radar sensing is desired in the same direction as wireless communications from the active wireless communication modules (e.g., for MPE violation detection). That is, step 1515 includes determining a subset of radar modules from which radar sensing is desired. In some such embodiments, at step 1520 the UE includes in the set of radar modules to activate, from the subset of radar modules, first radar modules that are not spatially positioned adjacent to one of the active wireless communication modules. In other such embodiments, at step 1520 the UE includes in the set of radar modules to activate, from the subset of radar modules, second radar modules that are spatially positioned adjacent to one of the active wireless communication modules, and then constrains the second radar modules to use radar beams having radiation patterns that do not overlap with radiation patterns of currently active communication beams used by the adjacent active wireless communication modules.

In further embodiments, step 1515 includes determining signal quality metrics of communication beams of the active wireless communication modules. In such embodiments, at step 1520 the UE includes, in the set of radar modules to activate, a subset of radar modules that are spatially positioned adjacent to one of the active wireless communication modules and then constrains radar beams used by the subset of radar modules based on the determined signal quality metrics.

For example, the UE may determine, for each of the active wireless communication modules, a worst communication beam as a communication beam that has a lowest signal quality metric. The UE then constrains each radar module of the subset to use a radar beam that is most similar to the worst communication beam of the adjacent active wireless communication module.

In another example, the UE may determine, for each of the active wireless communication modules, a worst communication beam as a communication beam that has a lowest signal quality metric, and a best communication beam as a communication beam that has a highest signal quality metric. The UE may then determine, for each radar module of the subset, a set of radar beams that has a similarity below a threshold amount with the best communication beam of the adjacent active wireless communication module, and from that set of radar beams, determine a radar beam that is most similar to the worst communication beam of the adjacent active wireless communication module. The UE subsequently constrains each radar module of the subset to use their respective determined radar beam.

In yet other embodiments, step 1515 includes obtaining information on an amount of interference caused by each radar beam that the radar modules are capable of generating (e.g., beams of the radar beam codebook) with each communication beam that the communication modules are capable of generating (e.g., beams of the communication beam codebook). This information can be obtained from simulations of the UE, or based on measurement data collected by the UE. In such embodiments, step 1515 further includes determining signal quality metrics of communication beams of the active wireless communication modules. The UE may then determine, for at least one of the active wireless communication modules, a best communication beam as a communication beam that has a highest signal quality metric. Subsequently, the UE may determine a selected radar beam as one of the radar beams that the radar modules are capable of generating that has a lowest amount of interference with the best communication beam. In such embodiments, at step 1520 the UE includes, in the set of radar modules to activate, one of the radar modules that is capable of generating the selected radar beam, and constrains the one radar module to use the selected radar beam.

Finally, at step 1525, the UE activates the determined set of radar modules.

The above flowchart illustrates an example method that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A wireless communication device comprising:
a plurality of wireless communication modules comprised of one or more antennas that are configured to transmit and receive wireless communication signals;
a plurality of radar modules comprised of one or more antennas that are configured to transmit and receive radar signals; and
a processor configured to:
 determine which of the plurality of wireless communication modules are active;
 obtain spatial information comprising spatial positions within the device of the wireless communication modules and the radar modules;
 determine one or more transmission characteristics of the active wireless communication modules and the radar modules;
 determine a set of the plurality of radar modules to activate based on the spatial information and the transmission characteristics including to determine to include, in the set of radar modules to activate, a first radar module based on a determination that the first radar module is not spatially positioned adjacent to any of the active wireless communication modules; and
 activate the determined set of radar modules.

2. The wireless communication device of claim 1, wherein the processor is configured to:
determine first frequency bands used by the active wireless communication modules;
determine second frequency bands used by the radar modules; and
determine to include, in the set of radar modules to activate, a second radar module based on a determination that the second radar module (i) is spatially positioned adjacent to at least one of the active wireless communication modules and (ii) that radar signals in the second frequency bands would not cause interference above a threshold amount with communication signals in the first frequency bands.

3. The wireless communication device of claim 1, wherein the processor is configured to:
determine first frequency bands used by the active wireless communication modules;
determine second frequency bands used by the radar modules; and
include all of the radar modules in the set of radar modules to activate, based on a determination that radar signals in the second frequency bands would not cause interference with communication signals in the first frequency bands.

4. The wireless communication device of claim 1, wherein the processor is further configured to:
determine a subset of radar modules from which radar sensing is desired;
include in the set of radar modules to activate, from the subset of radar modules, first radar modules that are not spatially positioned adjacent to one of the active wireless communication modules;
include in the set of radar modules to activate, from the subset of radar modules, second radar modules that are spatially positioned adjacent to one of the active wireless communication modules; and
constrain the second radar modules to use radar beams having radiation patterns that do not overlap with radiation patterns of currently active communication beams used by the adjacent active wireless communication modules.

5. The wireless communication device of claim 1, wherein the processor is further configured to:
determine signal quality metrics of communication beams of the active wireless communication modules;
include, in the set of radar modules to activate, a subset of radar modules that are spatially positioned adjacent to one of the active wireless communication modules; and
constrain radar beams used by the subset of radar modules based on the determined signal quality metrics.

6. The wireless communication device of claim 5, wherein the processor is further configured to:
determine, for each of the active wireless communication modules, a worst communication beam as a communication beam that has a lowest signal quality metric; and
constrain each radar module of the subset to use a radar beam that is most similar to the worst communication beam of the adjacent active wireless communication module.

7. The wireless communication device of claim 5, wherein the processor is further configured to:
- determine, for each of the active wireless communication modules, a worst communication beam as a communication beam that has a lowest signal quality metric, and a best communication beam as a communication beam that has a highest signal quality metric;
- for each radar module of the subset:
  - determine a set of radar beams that has a similarity below a threshold amount with the best communication beam of the adjacent active wireless communication module, and
  - determine a radar beam, from the set of radar beams, that is most similar to the worst communication beam of the adjacent active wireless communication module; and
- constrain each radar module of the subset to use their respective determined radar beam.

8. The wireless communication device of claim 1, wherein the processor is further configured to:
- obtain information on an amount of interference caused by each radar beam that the radar modules are capable of generating with each communication beam that the wireless communication modules are capable of generating;
- determine signal quality metrics of communication beams of the active wireless communication modules;
- determine, for at least one of the active wireless communication modules, a best communication beam as a communication beam that has a highest signal quality metric;
- determine a selected radar beam as one of the radar beams that the radar modules are capable of generating that has a lowest amount of interference with the best communication beam;
- include, in the set of radar modules to activate, one of the radar modules that is capable of generating the selected radar beam; and
- constrain the one radar module to use the selected radar beam.

9. A method for managing activation of radar modules of a wireless communication device, the method comprising:
- determining which of a plurality of wireless communication modules of the wireless communication device are active;
- obtaining spatial information comprising spatial positions within the device of the wireless communication modules and a plurality of radar modules of the wireless communication device;
- determining one or more transmission characteristics of the active wireless communication modules and the radar modules;
- determining a set of the plurality of radar modules to activate based on the spatial information and the transmission characteristics including determining to include, in the set of radar modules to activate, a first radar module based on a determination that the first radar module is not spatially positioned adjacent to any of the active wireless communication modules; and
- activating the determined set of radar modules.

10. The method of claim 9, further comprising:
- determining first frequency bands used by the active wireless communication modules;
- determining second frequency bands used by the radar modules; and
- determining to include, in the set of radar modules to activate, a second radar module based on a determination that the second radar module (i) is spatially positioned adjacent to at least one of the active wireless communication modules and (ii) that radar signals in the second frequency bands would not cause interference above a threshold amount with communication signals in the first frequency bands.

11. The method of claim 9, further comprising:
- determining first frequency bands used by the active wireless communication modules;
- determining second frequency bands used by the radar modules; and
- including all of the radar modules in the set of radar modules to activate, based on a determination that radar signals in the second frequency bands would not cause interference with communication signals in the first frequency bands.

12. The method of claim 9, further comprising:
- determining a subset of radar modules from which radar sensing is desired;
- including in the set of radar modules to activate, from the subset of radar modules, first radar modules that are not spatially positioned adjacent to one of the active wireless communication modules;
- including in the set of radar modules to activate, from the subset of radar modules, second radar modules that are spatially positioned adjacent to one of the active wireless communication modules; and
- constraining the second radar modules to use radar beams having radiation patterns that do not overlap with radiation patterns of currently active communication beams used by the adjacent active wireless communication modules.

13. The method of claim 9, further comprising:
- determining signal quality metrics of communication beams of the active wireless communication modules;
- including, in the set of radar modules to activate, a subset of radar modules that are spatially positioned adjacent to one of the active wireless communication modules; and
- constraining radar beams used by the subset of radar modules based on the determined signal quality metrics.

14. The method of claim 13, further comprising:
- determining, for each of the active wireless communication modules, a worst communication beam as a communication beam that has a lowest signal quality metric; and
- constraining each radar module of the subset to use a radar beam that is most similar to the worst communication beam of the adjacent active wireless communication module.

15. The method of claim 13, further comprising:
- determining, for each of the active wireless communication modules, a worst communication beam as a communication beam that has a lowest signal quality metric, and a best communication beam as a communication beam that has a highest signal quality metric;
- for each radar module of the subset:
  - determining a set of radar beams that has a similarity below a threshold amount with the best communication beam of the adjacent active wireless communication module, and
  - determining a radar beam, from the set of radar beams, that is most similar to the worst communication beam of the adjacent active wireless communication module; and constraining each radar module of the subset to use their respective determined radar beam.

16. A non-transitory computer-readable medium configured to store instructions that, when executed by a processor, cause an electronic device to:
   determine which of a plurality of wireless communication modules of the device are active;
   obtain spatial information comprising spatial positions within the device of the wireless communication modules and a plurality of radar modules of the device;
   determine one or more transmission characteristics of the active wireless communication modules and the radar modules;
   determine a set of the plurality of radar modules to activate based on the spatial information and the transmission characteristics including to determine to include, in the set of radar modules to activate, a first radar module based on a determination that the first radar module is not spatially positioned adjacent to any of the active wireless communication modules; and
   activate the determined set of radar modules.

17. The non-transitory computer-readable medium of claim 16, wherein the instructions, when executed by the processor, further cause the electronic device to:
   determine first frequency bands used by the active wireless communication modules;
   determine second frequency bands used by the radar modules; and
   determine to include, in the set of radar modules to activate, a second radar module based on a determination that the second radar module (i) is spatially positioned adjacent to at least one of the active wireless communication modules and (ii) that radar signals in the second frequency bands would not cause interference above a threshold amount with communication signals in the first frequency bands.

18. The non-transitory computer-readable medium of claim 16, wherein the instructions, when executed by the processor, further cause the electronic device to:
   determine first frequency bands used by the active wireless communication modules;
   determine second frequency bands used by the radar modules; and
   include all of the radar modules in the set of radar modules to activate, based on a determination that radar signals in the second frequency bands would not cause interference with communication signals in the first frequency bands.

19. The non-transitory computer-readable medium of claim 16, wherein the instructions, when executed by the processor, further cause the electronic device to:
   determine a subset of radar modules from which radar sensing is desired;
   include in the set of radar modules to activate, from the subset of radar modules, first radar modules that are not spatially positioned adjacent to one of the active wireless communication modules;
   include in the set of radar modules to activate, from the subset of radar modules, second radar modules that are spatially positioned adjacent to one of the active wireless communication modules; and
   constrain the second radar modules to use radar beams having radiation patterns that do not overlap with radiation patterns of currently active communication beams used by the adjacent active wireless communication modules.

20. The non-transitory computer-readable medium of claim 16, wherein the instructions, when executed by the processor, further cause the electronic device to:
   determine signal quality metrics of communication beams of the active wireless communication modules;
   include, in the set of radar modules to activate, a subset of radar modules that are spatially positioned adjacent to one of the active wireless communication modules; and
   constrain radar beams used by the subset of radar modules based on the determined signal quality metrics.

* * * * *